United States Patent
Tummala et al.

(10) Patent No.: US 10,318,166 B1
(45) Date of Patent: Jun. 11, 2019

(54) PRESERVING LOCALITY OF STORAGE ACCESSES BY VIRTUAL MACHINE COPIES IN HYPER-CONVERGED INFRASTRUCTURE APPLIANCES

(71) Applicant: EMC IP Holding Company LLC, Hopkinton, MA (US)

(72) Inventors: Himabindu Tummala, South Grafton, MA (US); Girish Sheelvant, Hopkinton, MA (US); William C. Davenport, San Diego, CA (US); Daniel Cummins, Hudson, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 15/392,676

(22) Filed: Dec. 28, 2016

(51) Int. Cl.
G06F 9/44 (2018.01)
G06F 3/06 (2006.01)
G06F 12/10 (2016.01)
G06F 9/455 (2018.01)

(52) U.S. Cl.
CPC ............ *G06F 3/061* (2013.01); *G06F 3/067* (2013.01); *G06F 3/0631* (2013.01); *G06F 3/0647* (2013.01); *G06F 3/0659* (2013.01); *G06F 3/0664* (2013.01); *G06F 9/45558* (2013.01); *G06F 12/10* (2013.01); *G06F 2009/45579* (2013.01); *G06F 2009/45583* (2013.01); *G06F 2212/1016* (2013.01); *G06F 2212/151* (2013.01); *G06F 2212/154* (2013.01); *G06F 2212/657* (2013.01)

(58) Field of Classification Search
CPC .......... G06F 3/061; G06F 9/4558; G06F 12/10
See application file for complete search history.

(56) References Cited

U.S. PATENT DOCUMENTS

| | | | |
|---|---|---|---|
| 6,802,062 B1 | 10/2004 | Oyamada et al. | |
| 8,352,942 B2 | 1/2013 | Shimogawa | |
| 8,990,805 B2 | 3/2015 | Yang et al. | |
| 9,348,724 B2 | 5/2016 | Ota et al. | |
| 2012/0324183 A1* | 12/2012 | Chiruvolu | G06F 11/2038 711/162 |
| 2013/0185719 A1* | 7/2013 | Kar | G06F 9/45558 718/1 |
| 2013/0219161 A1* | 8/2013 | Fontignie | G06F 8/63 713/2 |

(Continued)

*Primary Examiner* — Ryan Bertram
*Assistant Examiner* — Trang K Ta
(74) *Attorney, Agent, or Firm* — BainwoodHuang

(57) ABSTRACT

Techniques for preserving locality of storage accesses to copies of storage objects in a cluster of appliances. Mapping metadata is created indicating regions in a copy of a storage object that are mapped to local storage allocated from a target appliance. Read and write operations to regions of the copy that are mapped to storage in the target appliance are processed within the target appliance. Write operations to regions that are not mapped to storage in the target appliance cause storage to be allocated to the copy in the target appliance, mapped to the regions indicated by the write operations, and used to store the write data. Read operations to regions that are not mapped to storage in the target appliance are performed on an original storage object located on a source appliance, from which the copy of the storage object was made.

21 Claims, 6 Drawing Sheets

(56) References Cited

U.S. PATENT DOCUMENTS

| | | | | |
|---|---|---|---|---|
| 2014/0101279 A1* | 4/2014 | Nagami | ............. | H04L 67/1097 |
| | | | | 709/213 |
| 2015/0288592 A1* | 10/2015 | Baughman | ............. | H04L 43/16 |
| | | | | 709/224 |
| 2017/0168903 A1* | 6/2017 | Dornemann | ........ | G06F 11/1469 |
| 2017/0371696 A1* | 12/2017 | Prziborowski | ...... | G06F 9/45558 |

\* cited by examiner

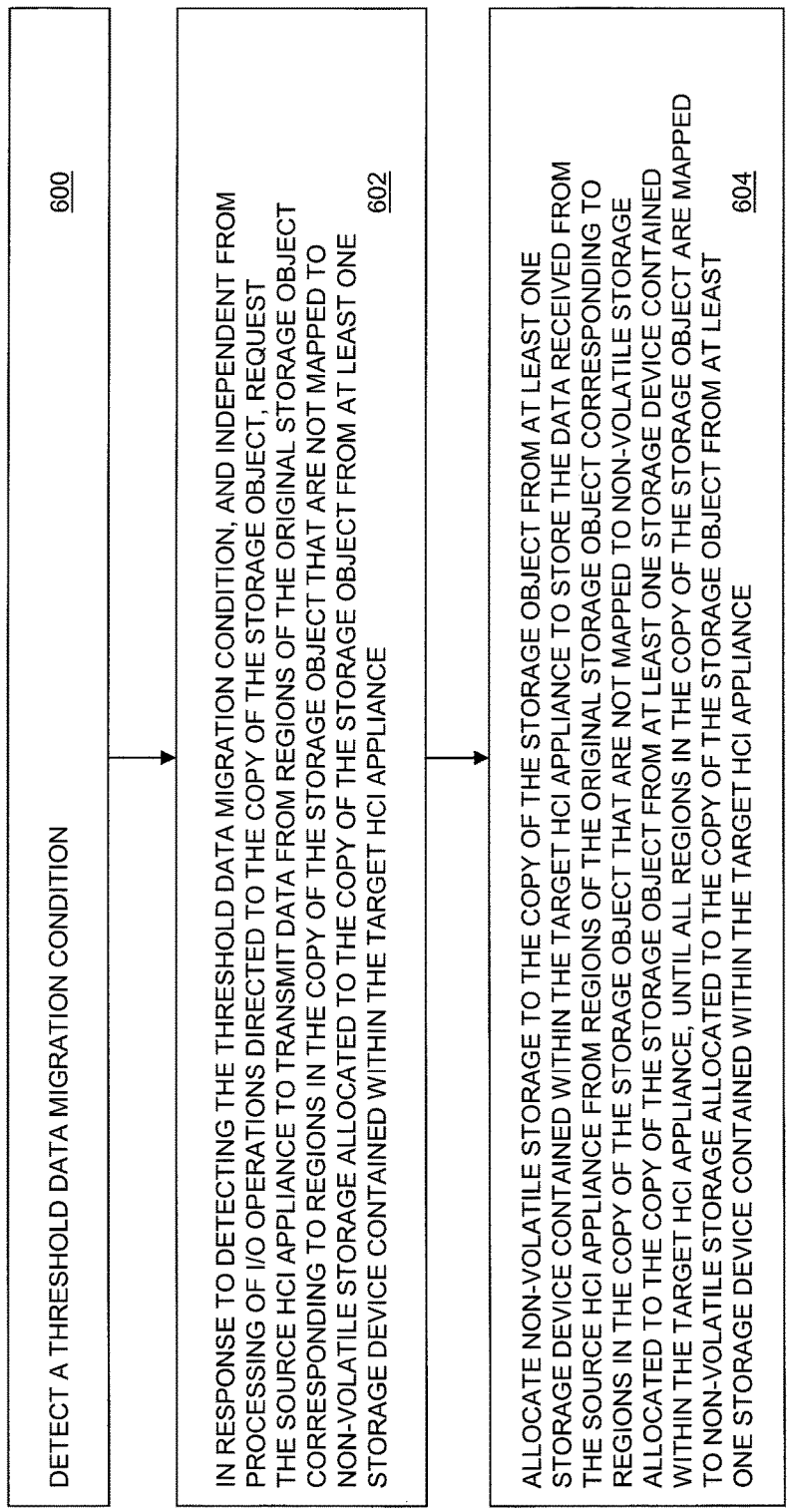

PRESERVING LOCALITY OF STORAGE ACCESSES BY VIRTUAL MACHINE COPIES IN HYPER-CONVERGED INFRASTRUCTURE APPLIANCES

TECHNICAL FIELD

The present disclosure relates generally to providing non-volatile storage in hyper-converged infrastructure (HCI) appliances, and more specifically to techniques for preserving locality of storage accesses by virtual machine copies executing on different HCI appliances than the original virtual machine from which they were created.

BACKGROUND

As it is generally known, a hyper-converged infrastructure ("HCI") is an information technology infrastructure framework that integrates storage and virtualization computing. In an HCI environment, storage and processing resources are provided together within individual HCI appliances. Specifically, each HCI appliance combines compute and non-volatile storage resources, together with memory and communication interfaces. Each HCI appliance includes a hypervisor or virtual machine monitor that may also be referred to as a virtualization platform, and that is referred to herein as a virtualization environment. One or more virtual machines are created by and run on the virtualization environment of each HCI appliance. The locality of directly attached storage resources with regard to virtual machines executing on the same HCI appliance can advantageously provide low latency for storage accesses. Multiple HCI appliances are often combined and managed together as a cluster of HCI appliances.

Under various circumstances, a copy must be made of a virtual machine located on one HCI appliance, and then brought up for execution on a different HCI appliance. One example of such circumstances is when new virtual machine copies are made from a primary virtual machine template (sometimes referred to as the "golden image" for a virtual machine), and then distributed across different HCI appliances within a cluster of HCI appliances for purposes of load balancing.

SUMMARY

Unfortunately, previous systems have had significant shortcomings with regard to preserving the locality of non-volatile storage in the case where a copy is made of an original virtual machine located on an original HCI appliance, but the copy is then moved to a new HCI appliance for execution. Specifically, when the copy of the virtual machine is executed on the new HCI appliance, it will consume virtualized non-volatile storage through copies of one or more storage objects, such as virtual volumes, that are presented by the virtualization environment. Because the storage object copies that are consumed by the copy of virtual machine were created from original storage objects on the original HCI appliance when the copy of the virtual machine was made, they are mapped to non-volatile storage allocated from storage devices contained in the original HCI appliance. As a result, all accesses made by the copy of the virtual machine to the copies of the storage objects result in network I/O operations that read data from or write data to non-volatile storage in storage devices contained in the original HCI appliance. Such exclusive reliance on network I/O operations can greatly increase I/O latency, and also increases the load on a network shared by the original and new HCI appliances.

To address these and other shortcomings of previous systems, improved techniques are disclosed herein for preserving locality of storage accesses by virtual machine copies executing on different HCI appliances than the original virtual machine from which they were created. Using the disclosed techniques, a copy of a virtual machine is executed on a target HCI appliance, after the copy was made on a source HCI appliance, from an original virtual machine located on the source HCI appliance. The copy of the virtual machine issues I/O operations to a copy of a storage object that is also located on the target HCI appliance, and that itself is a copy of an original storage object located on the source HCI appliance. The original storage object is mapped to non-volatile storage allocated to the original storage object from at least one storage device contained within the source HCI appliance.

Mapping metadata is created for the copy of the storage object. The mapping metadata for the copy of the storage object includes indications of which regions in the copy of the storage object are mapped to non-volatile storage allocated to the copy of the storage object from at least one storage device contained within the target HCI appliance, and indications of which regions in the copy of the storage object are not mapped to non-volatile storage allocated to the copy of the storage object from at least one storage device contained within the target HCI appliance.

I/O operations within the target HCI appliance that are directed to the copy of the storage object are intercepted within the target HCI appliance. In response to the intercepted I/O operations and the mapping metadata created for the copy of the storage object, those intercepted I/O operations that are directed to regions in the copy of the storage object that are mapped to non-volatile storage allocated to the copy of the storage object from at least one storage device contained within the target HCI appliance are processed using the non-volatile storage allocated to the copy of the storage object from the at least one storage device contained within the target HCI appliance. For each read I/O operation directed to a region in the copy of the storage object that is not mapped to non-volatile storage allocated to the copy of the storage object from a storage device contained within the target HCI appliance, the source HCI appliance is caused to perform a read I/O operation using the original storage object located on the source HCI appliance.

Processing each write I/O operation directed to regions in the copy of the storage object that are not mapped to non-volatile storage allocated to the copy of the storage object from a storage device contained within the target HCI appliance includes i) allocating non-volatile storage from at least one storage device contained within the target HCI appliance to the copy of the storage object to store the data for the write I/O operation, ii) storing the data for the write I/O operation into the non-volatile storage allocated from the at least one storage device contained within the target HCI appliance, and iii) modifying the mapping metadata for the copy of the storage object a) to map the region in the copy of the storage object to which the write I/O operation was directed to the allocated non-volatile storage, and b) to include an indication that the region in the copy of the storage object to which the write I/O operation was directed is now mapped to non-volatile storage allocated to the copy of the storage object from at least one storage device contained in the target HCI appliance.

Processing each read I/O operation directed to a region in the copy of the storage object that is not mapped to non-volatile storage allocated to the copy of the storage object from a storage device contained within the target HCI appliance may cause the source HCI appliance to perform the read I/O operation using the original storage object that is located on the source HCI appliance by i) transmitting a network I/O request to the source HCI appliance requesting that the source HCI appliance perform a read I/O operation on a region in the original storage that corresponds to the region in the copy of the storage object to which the read I/O operation to the copy of the storage object was directed, ii) receiving, from the source HCI appliance, data read by the source HCI appliance from the region in the original storage that corresponds to the region in the copy of the storage object to which the read I/O operation to the copy of the storage object was directed, and iii) returning, to a requesting entity that issued the read I/O operation directed to the copy of the storage object (e.g. the copy of the virtual machine executing on the target HCI appliance), the data read by the source HCI appliance from the region in the original storage object that corresponds to the region in the copy of the storage object to which the read I/O operation to the copy of the storage object was directed.

A copy of data written to the copy of the storage object on the target HCI appliance may be maintained on the source HCI appliance. For example, for each write I/O operation directed to the copy of the storage object, the target HCI appliance may transmit a network I/O request to the source HCI appliance requesting that the source HCI appliance perform a write I/O operation identical to the intercepted write I/O operation on a region of a mirror copy of the copy of the storage object, that corresponds to the region in the copy of the storage object to which the intercepted write I/O operation was directed. As a result, a copy of the data in all regions of the storage object that were written to on the target HCI appliance is maintained in the source HCI appliance, together with the data in all other regions of the copy of the storage object copy, i.e. within the non-volatile storage allocated to the original storage object). In this way a complete copy of the data in the copy of the storage object is maintained in the source HCI appliance, making it convenient to generate, on the source HCI appliance, point in time copies of the copy of the storage object that are generally referred to as "snapshots".

Processing each read I/O operation directed to a region in the copy of the storage object that is not mapped to non-volatile storage allocated to the copy of the storage object from at least one storage device contained within the target HCI appliance may further include i) storing, within a cache of the target HCI appliance, the data read by the source HCI appliance from the region in the original storage that corresponds to the region in the copy of the storage object to which the read I/O operation to the copy of the storage object was directed, and ii) returning the data stored in the cache in response to at least one subsequent read I/O operation directed to the same region in the copy of the storage object. In this way the latency of repeated reads I/O operations to the same regions in the copy of the storage object may be reduced by completing such read I/O operations using data stored in the cache.

A threshold data migration condition may be detected that causes, independently from processing of I/O operations directed to the copy of the storage object, requests to be issued to the source HCI appliance to transmit data from regions of the original storage object that correspond to regions in the copy of the storage object that are not mapped to non-volatile storage allocated to the copy of the storage object from at least one storage device contained within the target HCI appliance. Storage may then be allocated to the copy of the storage object from the at least one storage device contained within the target HCI appliance to store the data subsequently received from the source HCI appliance read from regions of the original storage object corresponding to regions in the copy of the storage object that are not mapped to non-volatile storage allocated to the copy of the storage object from at least one storage device contained within the target HCI appliance. Such requests and allocations may continue until all regions in the copy of the storage object are mapped to non-volatile storage allocated to the copy of the storage object from the at least one storage device contained within the target HCI appliance.

For example, the threshold data migration condition may consist of determining that a rate at which I/O operations are being performed on the copy of the storage object exceeds a predetermined maximum acceptable rate. In another example, the threshold data migration condition may consist of determining that an average latency experienced when performing network I/O operations to the original storage object on the source HCI appliance exceeds a predetermined maximum acceptable latency.

Embodiments of the disclosed techniques may provide significant advantages over previous approaches. When a copy of a virtual machine is executed on a target HCI appliance that is different from the source HCI appliance that contains the original virtual machine from which the copy was made, and the copy accesses a copy of a storage object on the target HCI appliance, locality of storage accesses is maintained for at least those regions of the copy of the storage object that are written to by the copy of the virtual machine while executing on the target HCI appliance. Network I/O operations to the source HCI appliance are accordingly reduced, resulting in lower storage access response times for the copy of the virtual machine executing on the target HCI appliance, as well as a reduction in the load on the network over which the source and target HCI appliances communicate.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 6 is a flow chart showing an example of steps that may be performed in response to detecting a threshold data migration condition to move data stored in the storage devices of the source HCI appliance to the target HCI appliance until all regions of the copy of the storage object are mapped to non-volatile storage allocated to the copy of the storage object from at least one storage device contained within the target HCI appliance.

DETAILED DESCRIPTION

Embodiments of the invention will now be described. It should be understood that the embodiments described below are provided only as examples, in order to illustrate various features and principles of the invention, and that the present invention is broader than the specific embodiments disclosed below.

Figure 1:
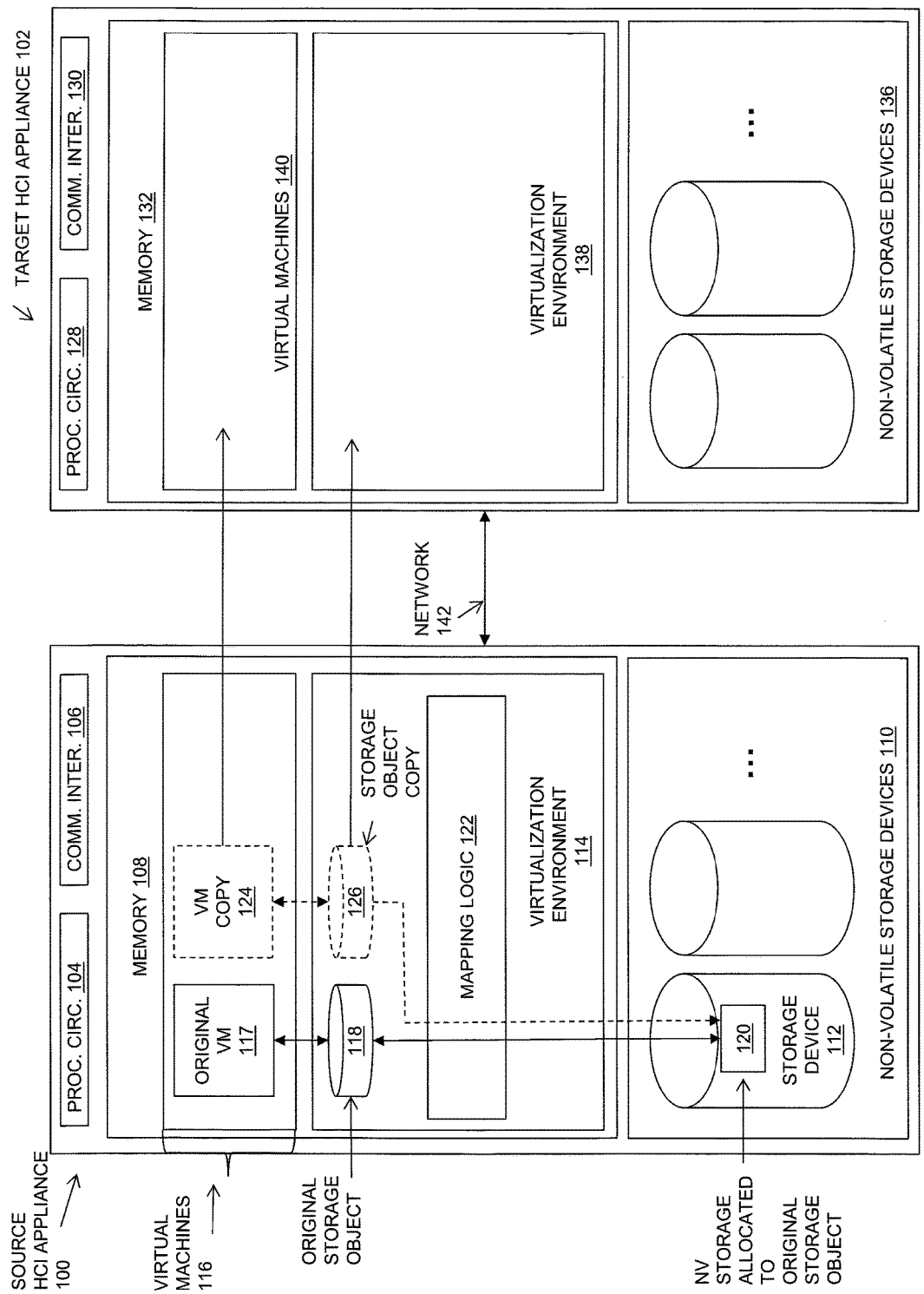
FIG. 1 is a block diagram showing an example of HCI appliances communicably connected by a network, and a copy being made of an original virtual machine located on a source HCI appliance that is to be executed on a target HCI appliance.

FIG. 1 is a block diagram showing an example of two HCI (Hyper-Converged Infrastructure) appliances that are communicably connected by a network, and further illustrates making a copy of an original virtual machine located on a source HCI appliance, that is to be executed on a target HCI appliance. In the example of FIG. 1, a Source HCI Appliance 100 is communicably coupled to a Target HCI Appliance 102. Source HCI Appliance 100 and Target HCI Appliance 102 are hyper-converged infrastructure appliances, and each provide virtualized compute resources and non-volatile storage resources to one or more virtual machines that they execute, based on processing circuitry and non-volatile storage devices that they contain.

Specifically, for example, Source HCI Appliance 100 includes Processing Circuitry 104, Communication Interfaces 106, Memory 108, and Non-Volatile Storage Devices 110. Processing Circuitry 104 may include one or more microprocessors, processing chips and/or assemblies. Communication Interfaces 106 may include, for example, SCSI target adapters and/or other types of network interface adapters for converting electronic and/or optical signals received over Network 142 into electronic form for use by Source HCI Appliance 100. Memory 108 may include both volatile memory (e.g., RAM), and non-volatile memory, such as one or more ROMs, disk drives, solid state drives, and the like. Processing Circuitry 104 and Memory 108 together form control circuitry, which is constructed and arranged to carry out various methods and functions as described herein. Memory 108 includes a variety of software constructs provided in the form of executable instructions. When these executable instructions are executed by Processing Circuitry 104, Processing Circuitry 104 is caused to carry out the operations of the software constructs. Although certain software constructs are specifically shown and described herein, those skilled in the art will recognize that Memory 108 may further include various other software constructs, which are not shown.

In the example of FIG. 1, the software constructs stored in Memory 108 and executed on Processing Circuitry 104 are shown to include a Virtualization Environment 114 and Virtual Machines 116. Virtualization Environment 114 may include a hypervisor or virtual machine monitor. Virtual Machines 116 include one or more virtual machines that may be created by and/or executed on Virtualization Environment 114. Virtualization Environment 114 may include a hypervisor or virtual machine monitor. Source HCI Appliance 100 may be considered to be or include at least one host computer with regard to Virtual Machines 116. Virtualization Environment 114 manages execution of each virtual machine in Virtual Machines 116, and distributes virtualized hardware resources of Source HCI Appliance 100 (e.g. compute resources, non-volatile storage resources, memory resources, communication interface resources, etc.) to Virtual Machines 116.

Non-Volatile Storage Devices 110 may include various specific types of non-volatile storage devices, such as magnetic disk drives, electronic flash drives, optical drives, and/or other types of drives. The storage devices in Non-Volatile Storage Devices 110 may take the form of RAID groups, where each RAID group is composed of multiple storage drives. It should be understood, though, that there is no requirement that Non-Volatile Storage Devices 110 be organized in RAID groups.

Further in the example of FIG. 1, Target HCI Appliance 102 is also shown including Processing Circuitry 128, Communication Interfaces 130, Memory 132, and Non-Volatile Storage Devices 136. Processing Circuitry 128 may include one or more microprocessors, processing chips and/or assemblies. Communication Interfaces 130 may include, for example, SCSI target adapters and/or other types of network interface adapters for converting electronic and/or optical signals received over Network 142 into electronic form for use by Target HCI Appliance 102. Memory 132 may include both volatile memory (e.g., RAM), and non-volatile memory, such as one or more ROMs, disk drives, solid state drives, and the like. Processing Circuitry 128 and Memory 132 together form control circuitry, which is constructed and arranged to carry out various methods and functions as described herein. Memory 132 includes a variety of software constructs provided in the form of executable instructions. When these executable instructions are executed by Processing Circuitry 128, Processing Circuitry 128 is caused to carry out the operations of the software constructs. Although certain software constructs are specifically shown and described herein, those skilled in the art will recognize that Memory 132 may further include various other software constructs, which are not shown.

As shown in the example of FIG. 1, the software constructs stored in Memory 132 and executed on Processing Circuitry 128 may include a Virtualization Environment 138 and Virtual Machines 140. Virtualization Environment 138 may include a hypervisor or virtual machine monitor. Virtual Machines 140 include one or more virtual machines that may be created by and/or executed on Virtualization Environment 138. Virtualization Environment 138 may include a hypervisor or virtual machine monitor. Target HCI Appliance 102 may be considered to be or include at least one host computer with regard to Virtual Machines 140.

Virtualization Environment 138 manages execution of each virtual machine in Virtual Machines 140, and distributes virtualized hardware resources of Target HCI Appliance 102 (e.g. compute resources, non-volatile storage resources, memory resources, communication interface resources, etc.) to Virtual Machines 140.

Non-Volatile Storage Devices 136 may include various specific types of non-volatile storage devices, such as magnetic disk drives, electronic flash drives, optical drives, and/or other types of drives. The storage devices in Non-Volatile Storage Devices 136 may take the form of RAID groups, where each RAID group is composed of multiple storage drives. It should be understood, though, that there is no requirement that Non-Volatile Storage Devices 136 be organized in RAID groups.

Network 142 may be any type of network or combination of networks, such as, for example, a storage area network (SAN), a local area network (LAN), a wide area network (WAN), the Internet, and/or some other type of network or combination of networks.

Further in the example shown in FIG. 1, Virtual Machines 116 include an Original Virtual Machine 117. Original Virtual Machine 117 may be any specific type of virtual machine. For example, Original Virtual Machine 117 may be what is generally referred to as a "golden image" virtual machine, which is an archetypal version that is used to create multiple copies of Virtual Machine 117. In one example, Virtual Machine 117 may consist of or include a Virtual Desktop Infrastructure (VDI). Original Virtual Machine 117 accesses non-volatile storage provided by Virtualization Environment 114 through an Original Storage Object 118. Original Storage Object 118 may consist of or include one or more logical disks commonly referred to as LUNs, one or more host file systems, one or more virtual machine disks commonly referred as virtual volumes, and/or other types of storage objects, which the Virtualization Environment 114 makes accessible to Original Virtual Machine 117 for reading and/or writing. Original Storage Object 118 may, for example, be considered part of Virtual Machine 117.

Original Storage Object 118 is mapped to portions of one or more storage devices in Non-Volatile Storage Devices 110 that are allocated to Original Storage Object 118. Accordingly, each region in an address space of Original Storage Object 118 may be mapped to a unit of non-volatile storage allocated to Original Storage Object 118. Mapping Logic 122 operates to map I/O operations directed to Original Storage Object 118 to Non-Volatile Storage 120 allocated from Storage Device 112 to Original Virtual Machine 117. In this regard, Mapping Logic 122 may include mapping metadata indicating specific units of Non-Volatile Storage 120 that are mapped to specific regions within Original Storage Object 118. When an I/O operation is received by Virtualization Environment 114 that is directed to Original Storage Object 118, it may, for example, contain or indicate an offset into Original Storage Object 118 indicating the region within Original Storage Object 118 on which the I/O operation is to be performed. Mapping Logic 122 may then use the offset contained in the I/O operation and the mapping metadata contained in Mapping Logic 122 to determine a specific unit of non-volatile storage within Non-Volatile Storage 120 on which the I/O operation is to be performed.

As further shown in FIG. 1, a copy of Original Virtual Machine 117 is created, shown by Virtual Machine Copy 124. In connection with, or as a result of creation of Virtual Machine Copy 124, a copy of Original Storage Object 118 is also created, shown by Storage Object Copy 126. When Storage Object Copy 126 is initially created, the Storage Object Copy 126 is mapped to the same non-volatile storage that is allocated to Original Storage Object 118, e.g. Non-Volatile Storage 120. Creation of Virtual Machine Copy 124 and Storage Object Copy 126 may, for example, be the result of what is sometimes referred to as a "fast clone" operation or the like. As part of the creation of Virtual Machine Copy 124, Virtual Machine Copy 124 is moved to and caused to execute on Target HCI Appliance 102. For example, Virtual Machine Copy 124 may be caused to execute on Target HCI Appliance 102, as one of Virtual Machines 140, to provide load balancing with regard to multiple HCI appliances including Source HCI Appliance 100 and Target HCI Appliance 102. To support execution of Virtual Machine Copy 124 on Target HCI Appliance 102, Storage Object Copy 126 is also moved to Target HCI Appliance 102, e.g. to be provided to Virtual Machine Copy 124 by Virtualization Environment 138. For example, Target HCI Appliance 102 may be indicated as the "host" in which Virtual Machine Copy 124 is to execute through a parameter provided to the fast clone command that caused Virtual Machine Copy 124 to be created from Original Virtual Machine 117.

Those skilled in the art will recognize that while for purposes of concise illustration only two HCI appliances are shown in FIG. 1, Source HCI Appliance 100 and Target HCI Appliance 102 may be part of a larger number of HCI appliances organized together as a cluster of HCI appliances communicably interconnected by Network 142.

Figure 2:
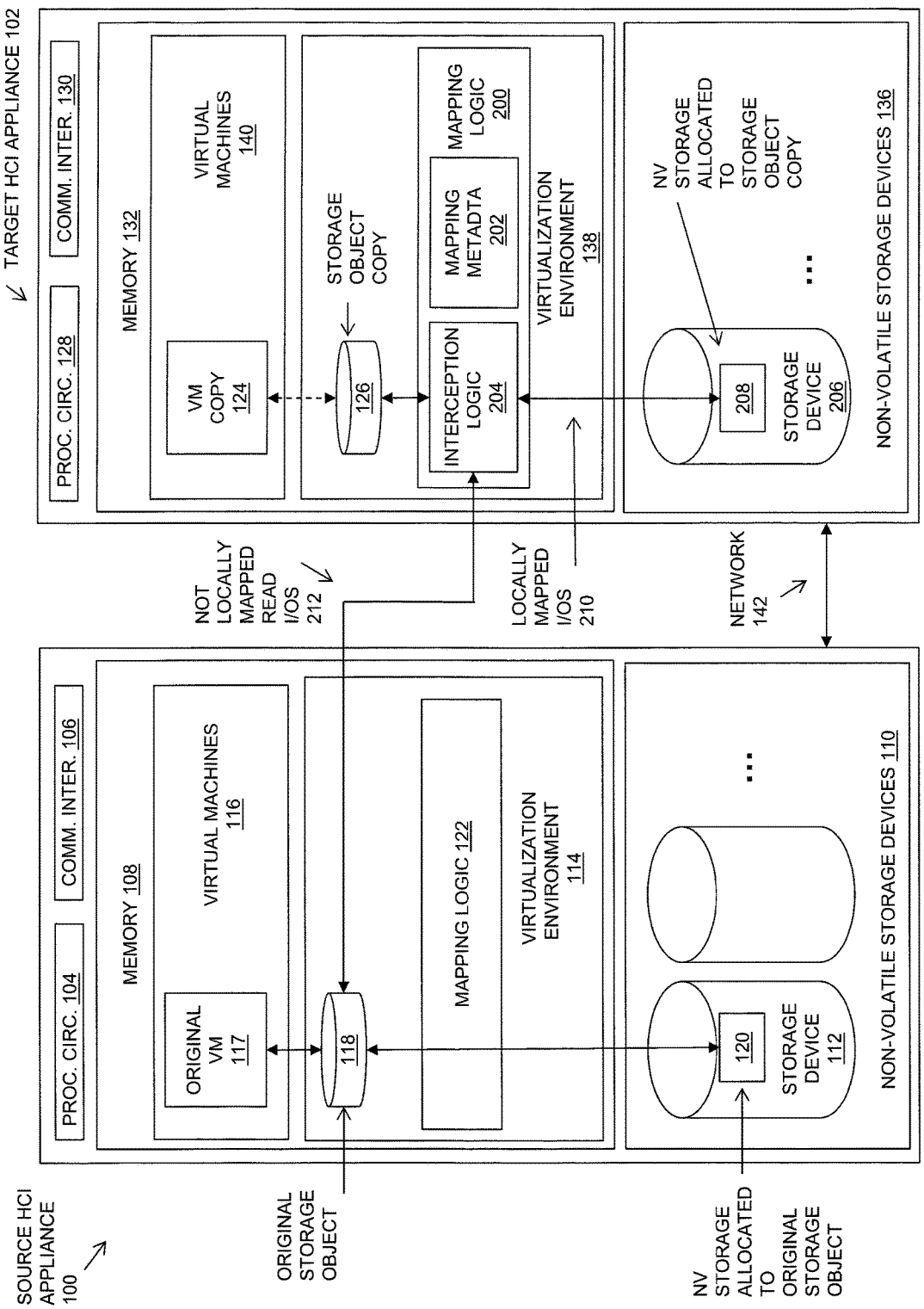
FIG. 2 is a block diagram showing an example of the two HCI appliances of FIG. 1, operating after the copy of the virtual machine has been brought up for execution on the target HCI appliance.

FIG. 2 is a block diagram showing an example of the two HCI appliances of FIG. 1, operating after Virtual Machine Copy 124 has been brought up for execution on Target HCI Appliance 102. In response to Virtual Machine Copy 124 being copied to and/or brought up for execution on Target HCI Appliance 102, Virtualization Environment 138 creates Mapping Metadata 202 for Storage Object Copy 126 in the Mapping Logic 200. Mapping Metadata 202 includes indications of the regions in Storage Object Copy 126 that are mapped to non-volatile storage that is allocated to Storage Object Copy 126 from one or more storage devices in Non-Volatile Storage Devices 136, e.g. Non-Volatile Storage 208 in Storage Device 206. Mapping Metadata 202 further includes indications of the regions in Storage Object Copy 126 that are not mapped to non-volatile storage that is allocated to Storage Object Copy 126 from one or more storage devices in Non-Volatile Storage Devices 136. When Virtual Machine Copy 124 is initially copied to and brought up for execution on Target HCI Appliance 102, all regions in Storage Object Copy 126 may, for example, not be mapped to non-volatile storage that is allocated to Storage Object Copy 126 from one or more storage devices in Non-Volatile Storage Devices 136. As Virtual Machine Copy 124 performs write I/O operations on regions of Storage Object Copy 126, and/or as data is migrated from Source HCI Appliance 100 in response to detecting a threshold data migration condition, regions in Storage Object Copy 126 will become mapped to non-volatile storage allocated to Storage Object Copy 126 from one or more storage devices in Non-Volatile Storage Devices 136, e.g. to Non-Volatile Storage 208 in Storage Device 206.

For each region in the address space of Storage Object Copy 126 that is mapped to Non-Volatile Storage 208, Mapping Metadata 202 may include mapping metadata indicating a specific unit of Non-Volatile Storage 208 that is mapped to that region. Each I/O operation received by Virtualization Environment 138 that is directed to Storage Object Copy 126 may, for example, contain or indicate an offset into Storage Object Copy 126 indicating a region within Storage Object Copy 126 on which the I/O operation is to be performed. For those regions in Storage Object Copy 126 that are mapped to Non-Volatile Storage 208, Interception Logic 204 may use the offset contained in the I/O operation and the mapping metadata contained in Mapping Metadata 202 to determine the specific unit of non-volatile storage within Non-Volatile Storage 208 on which the I/O operation is to be performed.

Interception Logic 204 intercepts all I/O operations within the target HCI appliance that are directed to the Storage Object Copy 126. Each I/O operation intercepted by Interception Logic 204 originates with an entity that is one of the Virtual Machines 140 executing in Target HCI Appliance 102, e.g. with Virtual Machine Copy 124.

For each intercepted I/O operation, Interception Logic 204 determines, based on the region of Storage Object Copy 126 indicated by the intercepted I/O operation as the region of Storage Object Copy 126 on which the I/O operation is to be performed, and on the Mapping Metadata 202, whether the I/O operation is directed to a region in Storage Object Copy 126 that is mapped to Non-Volatile Storage 208. Interception Logic 204 processes those I/O operations that are directed to regions in Storage Object Copy 126 that are mapped to Non-Volatile Storage 208 as Locally Mapped I/Os 210, using Non-Volatile Storage 208. Accordingly, read I/O operations directed to regions in Storage Object Copy 126 that are mapped to Non-Volatile Storage 208 are processed by reading data from Non-Volatile Storage 208, and write I/O operations directed to regions in Storage Object Copy 126 that are mapped to Non-Volatile Storage 208 are processed by writing data to Non-Volatile Storage 208.

Interception Logic 204 processes read I/O operations that are directed to regions in Storage Object Copy 126 that are not mapped to Non-Volatile Storage 208 by generating network I/O read requests that are transmitted from Target HCI Appliance 102 to Source HCI Appliance 100, as shown by Not Locally Mapped Read I/Os 212. Each read I/O operation directed to a region in Storage Object Copy 126 that is not mapped to Non-Volatile Storage 208 is processed by transmitting a network I/O read request from Target HCI Appliance 102 to Source HCI Appliance 100, which causes Source HCI Appliance 100 to perform the read I/O operation using the Original Storage Object 118 to access Non-Volatile Storage 120, i.e. to read data from Non-Volatile Storage 120.

For example, Interception Logic 204 may process an intercepted read I/O operation directed to a region of Storage Object Copy 126 that is not mapped to Non-Volatile Storage 208 by transmitting a network I/O request to Source HCI Appliance 100 requesting that Source HCI Appliance 100 (e.g. Virtualization Environment 114) perform a read I/O operation on the same region in Original Storage Object 118 as the region in Storage Object Copy 126 to which the intercepted read I/O operation was directed. The data obtained from Non-Volatile Storage 120 by performing the read I/O operation is then transmitted from Source HCI Appliance 100 back to Target HCI Appliance 102 for receipt by Interception Logic 204. Interception Logic 204 returns the data obtained by performing the read I/O operation on the same region in Original Storage Object 118 as the region in Storage Object Copy 126 to which the intercepted read I/O operation was directed to the requesting entity for the intercepted read I/O operation, e.g. to Virtual Machine Copy 124.

Interception Logic 204 processes each write I/O operation directed to a region in Storage Object Copy 126 that is not mapped to Non-Volatile Storage 208 by allocating a unit of non-volatile storage from at least one storage device in Non-Volatile Storage Devices 136 to Storage Object Copy 126, in order to locally store the data for the write I/O operation. For example, Interception Logic 204 may allocate a unit of non-volatile storage from Storage Device 206, add the newly allocated unit of non-volatile storage to Non-Volatile Storage 208, and then store the data from the intercepted write I/O operation into the newly allocated unit of non-volatile storage. Interception Logic 204 then modifies Mapping Metadata 202 to map the region in Storage Object Copy 126 to which the intercepted write I/O operation was directed to the newly allocated unit of non-volatile storage. Interception Logic 204 also modifies Mapping Metadata 202 to include an indication that the region in Storage Object Copy 126 to which the intercepted write I/O operation was directed is now mapped to non-volatile storage allocated to Storage Object Copy 126 from at least one storage device contained in Non-Volatile Storage Devices 136.

Figure 3:
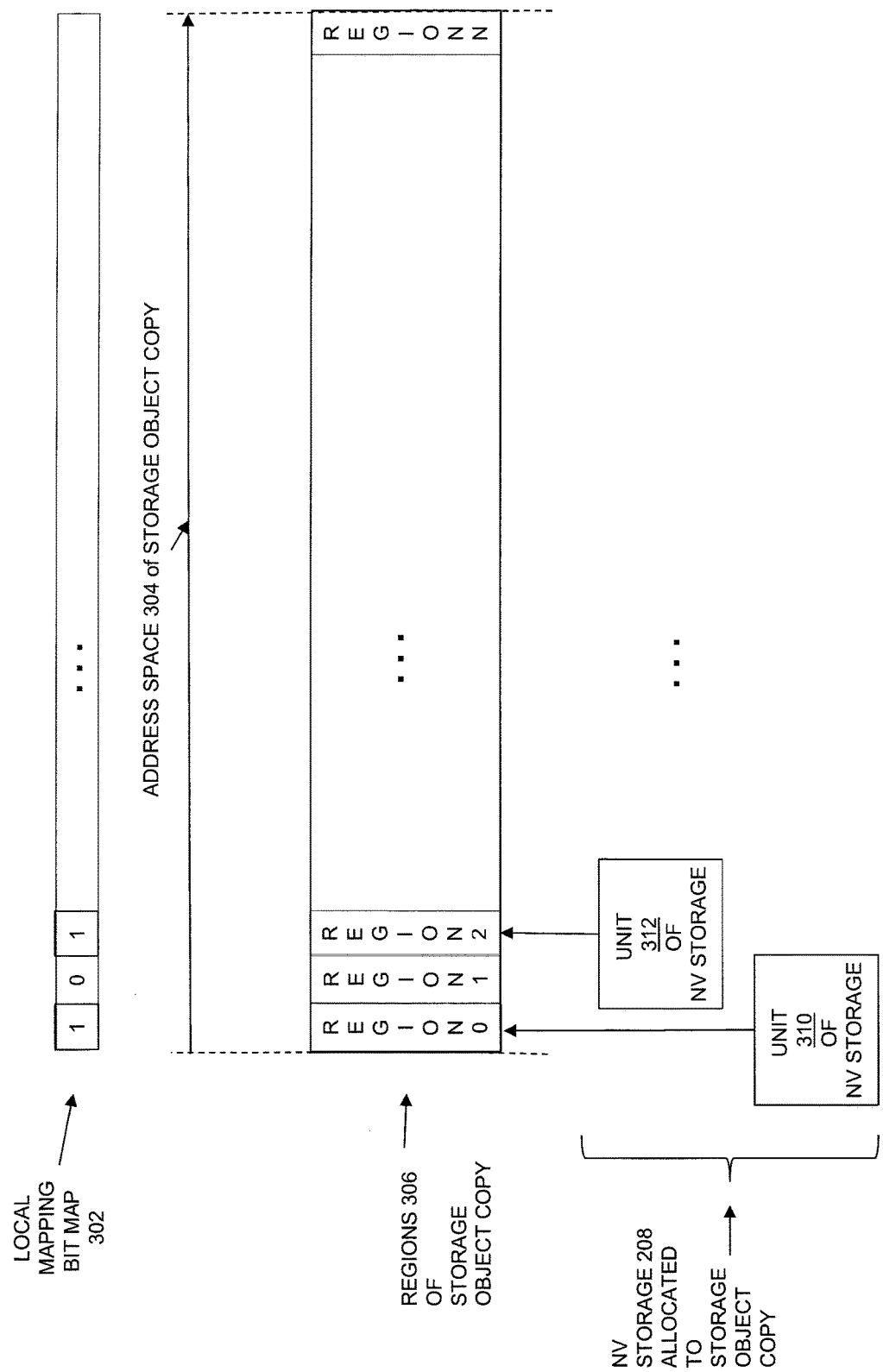
FIG. 3 is a diagram showing an example of mapping metadata that may be created and used according to the disclosed techniques.

FIG. 3 is a diagram showing an example of Mapping Metadata 202 that may be created and used in response to Virtual Machine Copy 124 being copied to and/or brought up for execution on Target HCI Appliance 102. As shown in FIG. 3, an Address Space 304 of Storage Object Copy 126 may be divided into Regions 306. Regions 306 are accordingly regions of Storage Object Copy 126 to which I/O operations may be directed. For example, the Regions 306 may all be of equal size. The size of each one of the Regions 306 may, for example, be equal to the size of a "block", which may be the size of the smallest allocatable unit of non-volatile storage, such as 8 KB.

As further shown in FIG. 3, Mapping Metadata 202 may include a Local Mapping Bit Map 302, which is used to store indications of which ones of the Regions 306 are mapped to non-volatile storage allocated to the Storage Object Copy 126 from at least one storage device contained within Target HCI Appliance 102, and indications of which ones of the Regions 306 are not mapped to non-volatile storage allocated to the copy of the storage object from at least one storage device contained within Target HCI Appliance 102. For example, each slot in Local Mapping Bit Map 302 corresponds to one of the Regions 306, and a slot storing a bit value of 1 indicates that the corresponding one of the Regions 306 is mapped to non-volatile storage allocated to the Storage Object Copy 126 from at least one storage device contained within Target HCI Appliance 102. A slot storing a bit value of 0 indicates that the corresponding one of the Regions 306 is not mapped to non-volatile storage allocated to the Storage Object Copy 126 from at least one storage device contained within Target HCI Appliance 102. In the example of FIG. 3, a first slot and a third slot in Local Mapping Bit Map 302 store bit values of 1, indicating that Region 0 and Region 2 are mapped to non-volatile storage allocated to Storage Object Copy 126 from at least one storage device contained within Target HCI Appliance 102. A second slot in Local Mapping Bit Map 302 stores a bit value of 0, indicating that Region 1 is not mapped to non-volatile storage allocated to Storage Object Copy 126.

FIG. 3 also shows that Mapping Metadata 202, may further include indications of which units (e.g. blocks) of non-volatile storage in Non-Volatile Storage 208 are allocated to specific regions in Regions 306. For example, in FIG. 3, Mapping Metadata 202 includes an indication that Unit 310 of Non-Volatile Storage 208 is mapped to Region 0 in 306, and an indication that Unit 312 of Non-Volatile Storage 208 is mapped to Region 2 in Regions 306.

Figure 4:
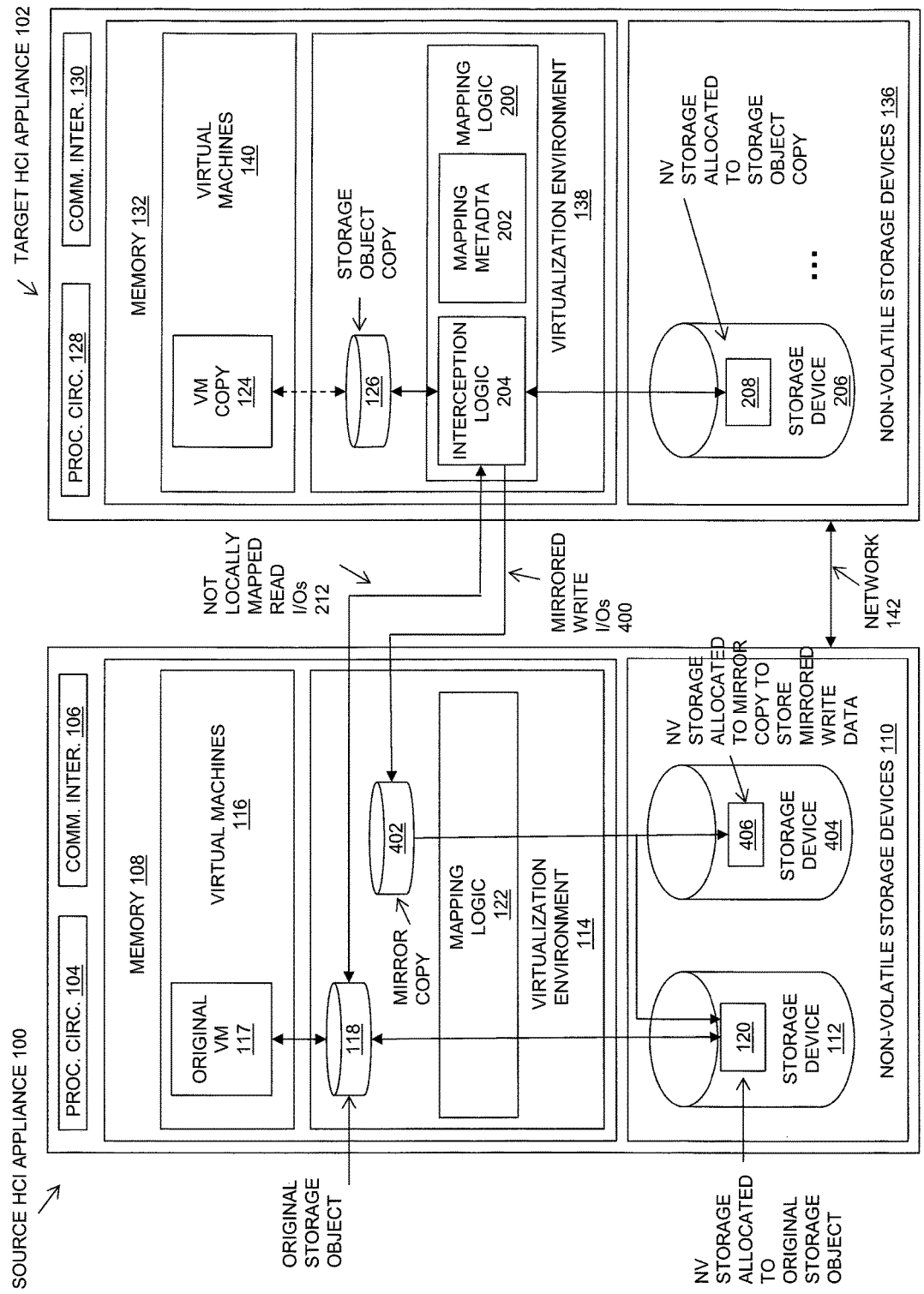
FIG. 4 is a block diagram showing an example of how a copy of data written to the copy of the storage object on the target HCI appliance may be maintained on the source HCI appliance.

FIG. 4 is a block diagram showing an example of how a copy of data written to Storage Object Copy 126 on Target HCI Appliance 102 may be maintained on Source HCI Appliance 100. As shown in FIG. 4, Interception Logic 204 may, for each write I/O operation directed to Storage Object Copy 126 that it intercepts, transmit a network I/O request to Source HCI Appliance 100 requesting that Source HCI Appliance 100 (e.g. Virtualization Environment 114) perform a write I/O operation identical to the intercepted write I/O operation on a region of a Mirror Copy 402 storage object in Source HCI Appliance 100 that is the same as the region in the Storage Object Copy 126 to which the intercepted write I/O operation was directed. As data is written to Mirror Copy 402, Non-Volatile Storage 406 is allocated from one or more of the Non-Volatile Storage Devices 110 (e.g. from Storage Device 404) to store the mirrored write data received from Target HCI Appliance 102. Each write I/O operation to Storage Object Copy 126 is thus mirrored to Mirror Copy 402. As a result, a copy of the data in all regions of Storage Object Copy 126 that were written to on Target HCI Appliance 102 is maintained in Non-Volatile Storage 406, while a copy of the data in all other regions of Storage Object Copy 126 is maintained in Non-Volatile Storage 120. In this way a complete copy of the data in Storage Object Copy 126 is maintained in Source HCI Appliance 100, thus making it convenient to generate point in time copies of Storage Object Copy 126 referred to as "snapshots", on Source HCI Appliance 100.

Figure 5:
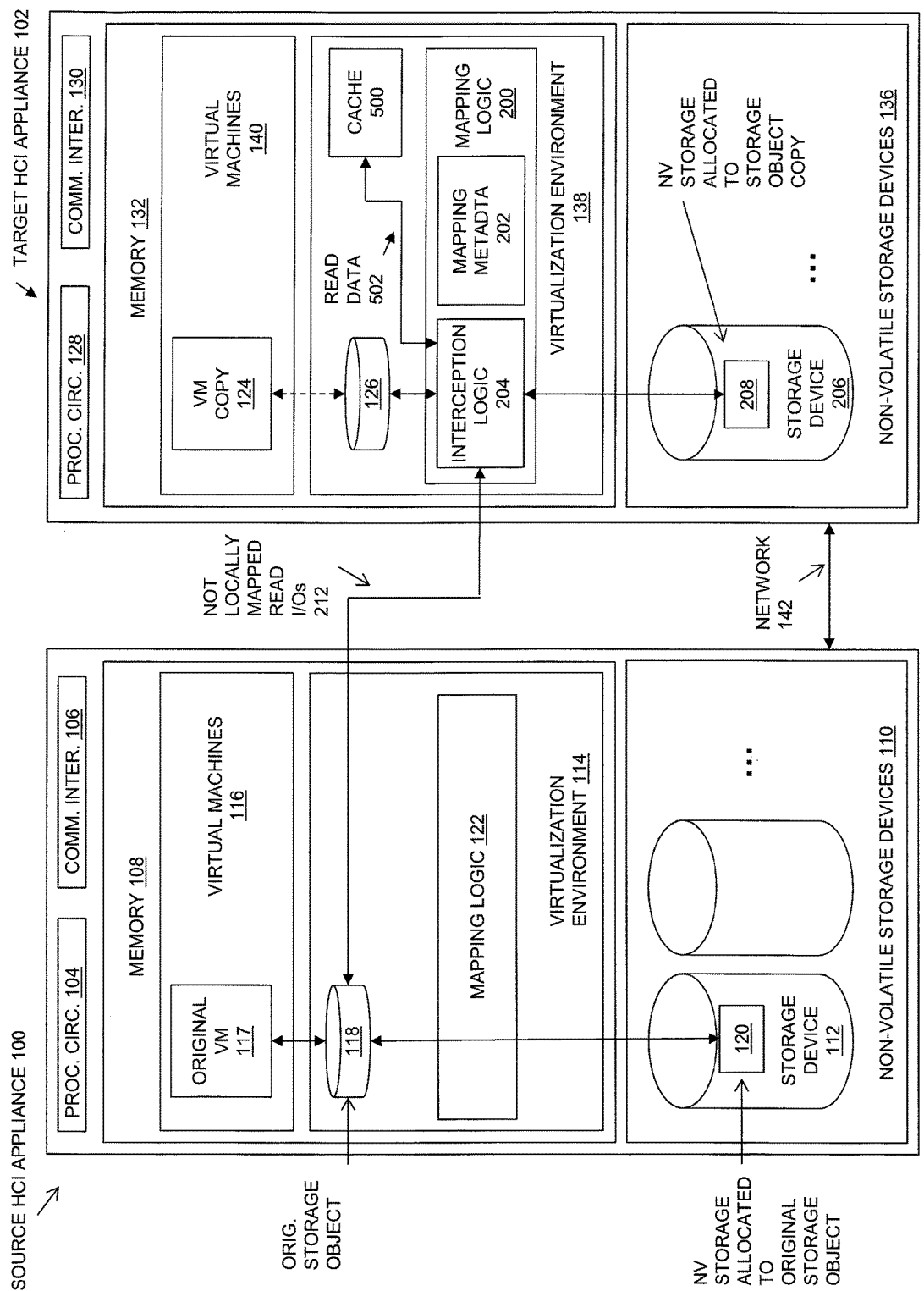
FIG. 5 is a block diagram showing an example of how data read from the copy of the storage object may be maintained in a cache of the target HCI appliance.

FIG. 5 is a block diagram showing an example of how data read from Storage Object Copy 126 may be maintained in a Cache 500 of Target HCI Appliance 102. In the example of FIG. 5, Interception Logic 204 processes each intercepted read I/O operation directed to a region of Storage Object Copy 124 that is not mapped to non-volatile storage allocated to Storage Object Copy 124 from at least one storage device contained within the Target HCI Appliance 102, by storing, within the Cache 500, the data read by the Source HCI Appliance 100 from the same region in the Original Storage Object 118 as the region in Storage Object Copy 126 to which the intercepted read I/O operation was directed. The data read by the Source HCI Appliance 100 from the same region in the Original Storage Object 118 as the region in Storage Object Copy 126 to which the intercepted read I/O operation was directed is shown by Read Data 502 in FIG. 5. Interception Logic 204 may then return the data stored in Cache 500 in response to at least one subsequent read I/O operation directed to the same region in Storage Object Copy 126. In this way, such subsequent read I/O operations may be performed locally without having to access data stored in the Non-Volatile Storage Devices 110 of the Source HCI Appliance 100. In addition, Cache 500 may also be used to store data read from Non-Volatile Storage 208 while processing intercepted read I/O operations directed to regions of Storage Object Copy 126 that are mapped to non-volatile storage allocated to Storage Object Copy 124 from at least one storage device contained within the Target HCI Appliance 102. In this way, subsequent read I/O operations directed to regions of Storage Object Copy 126 that are mapped to non-volatile storage allocated to Storage Object Copy 124 from at least one storage device contained within the Target HCI Appliance 102 may be performed locally without having to access data stored in the Non-Volatile Storage Devices 136 of the Target HCI Appliance 102.

FIG. 6 is a flow chart showing an example of steps that may be performed in response to detecting a threshold data migration condition, in order to move data stored in the Non-Volatile Storage Devices 110 of the Source HCI Appliance 100 to at least one storage device in the Target HCI Appliance 102, until all regions of the Storage Object Copy 126 are mapped to non-volatile storage allocated to the Storage Object Copy 126 from at least one storage device contained within the Target HCI Appliance 102. One or more of the steps of FIG. 6 may, for example, be performed by program code within Virtualization Environment 138 that operates separately and independently from the processing performed by Interception Logic 204 with regard to intercepted I/O operations directed to Storage Object Copy 126. For example, one or more of the steps of FIG. 6 may be performed by one or more background processes that execute opportunistically, during time periods when shared resources within Target HCI Appliance 102 are not being used to process intercepted I/O operations directed to Storage Object Copy 126, and are accordingly available to perform one or more of the steps shown in FIG. 6.

At step 600, a threshold data migration condition is detected. In response to detecting the threshold data migration condition at step 600, at step 602, independently from processing intercepted I/O operations directed to Storage Object Copy 126, Target HCI Appliance 102 requests that Source HCI Appliance 100 transmit data from regions in the Original Storage Object 118 that correspond to regions in the Storage Object Copy 126 that are not mapped to non-volatile storage allocated to Storage Object Copy 126. At step 604, non-volatile storage is allocated to the Storage Object Copy 126 from at least one storage device contained within Target HCI Appliance 102, to store the data received from Source HCI Appliance 100 that was read from regions of the Original Storage Object 118 corresponding to regions in the Storage Object Copy 126 that are not mapped to non-volatile storage allocated to the Storage Object Copy 126 from at least one storage device contained within the Target HCI Appliance 102, until all regions in the Storage Object Copy 126 are mapped to non-volatile storage allocated to the Storage Object Copy 126 from at least one storage device contained within the Target HCI Appliance 102. As a result, all data in the Storage Object Copy 126 is stored in non-volatile storage allocated from the Non-Volatile Storage Devices 136 to Storage Object Copy 126, and any subsequent access to Storage Object Copy 126 by Virtual Machine Copy 124 or any other virtual machine in Virtual Machines 140 can be performed without having to access the Non-Volatile Storage Devices 110 in Source HCI Appliance 100.

Various specific types of threshold data migration conditions may be detected at step 600. For example, a rate at which I/O operations are performed on Storage Object Copy 126 may be maintained, e.g. by program code within Virtualization Environment 138 such as Interception Logic 204. The rate at which I/O operations are performed on Storage Object Copy 126 may increase, for example, as increasing numbers of virtual machines are caused to execute in Virtual Machines 140 and access Storage Object Copy 126. Such additional virtual machines may, for example, consist of or include additional copies (e.g. fast clones) of Original Virtual Machine 117 and/or Virtual Machine Copy 124. Detecting the threshold data migration condition at step 600 may then include or consist of determining that the rate at which I/O operations are being performed on Storage Object Copy 126 exceeds a predetermined maximum acceptable rate, e.g. exceeds a predetermined maximum IOPS.

In another example, a latency for completion of network I/O requests to the Source HCI Appliance 100 may be monitored. Detecting the threshold data migration condition in step 600 may then consist of or include determining that the latency for completion of network I/O requests to the Source HCI Appliance 100 exceeds a predetermined maximum acceptable latency. Such latency for completion of network I/O requests to the Source HCI Appliance 100 may increase, for example, as network congestion increases on the Network 142 over which Target HCI Appliance 102 and Source HCI Appliance 100 communicate.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of preserving locality of storage accesses in a target hyper-converged infrastructure (HCI) appliance, the method comprising the steps of:

causing a copy of a virtual machine to be moved to and executed on the target HCI appliance, wherein the copy of the virtual machine is a copy of an original virtual machine that is located on a source HCI appliance, wherein the copy of the virtual machine issues I/O operations to a copy of a storage object that is also moved to the target HCI appliance, wherein the copy of the storage object is a copy of an original storage object that is located on the source HCI appliance, wherein the original storage object is accessed by the original virtual machine located on the source HCI appliance, and wherein the original storage object is mapped to non-volatile storage allocated to the original storage object from at least one storage device contained within the source HCI appliance;

in response to the copy of the virtual machine being moved to the target HCI appliance, creating mapping metadata for the copy of the storage object that includes indications of regions in the copy of the storage object that are mapped to non-volatile storage allocated to the copy of the storage object from at least one storage device contained within the target HCI appliance, and indications of regions in the copy of the storage object that are not mapped to non-volatile storage allocated to the copy of the storage object from at least one storage device contained within the target HCI appliance, wherein the mapping metadata initially indicates, at the time the copy of the virtual machine is moved to the target HCI appliance, that no regions of the copy of the storage object are mapped to non-volatile storage allocated to the copy of the storage object from at least one storage device contained within the target HCI appliance;

intercepting I/O operations issued by the copy of the virtual machine executing on the target HCI appliance and directed to regions in the copy of the storage object, while the original storage object is simultaneously being accessed by the original virtual machine located on the source HCI appliance;

in response to the intercepted I/O operations, maintaining on the source HCI appliance a copy of data written to the copy of the storage object by, for each write I/O operation directed to the copy of the storage object, transmitting a network I/O request to the source HCI appliance requesting that the source HCI appliance perform a write I/O operation identical to the intercepted write I/O operation on a mirror copy of the copy of the storage object, wherein the mirror copy of the copy of the copy of the storage object that is located on the source HCI appliance is separate and independent from the original storage object; and in response to the intercepted I/O operations and the mapping metadata for the copy of the storage object,
  i) processing those intercepted I/O operations directed to regions in the copy of the storage object that are mapped to non-volatile storage allocated to the copy of the storage object from at least one storage device contained within the target HCI appliance using the non-volatile storage allocated to the copy of the storage object from the at least one storage device contained within the target HCI appliance, and ii) processing those intercepted I/O operations directed to regions in the copy of the storage object that are not mapped to non-volatile storage allocated to the copy of the storage object from at least one storage device contained within the target HCI appliance by, for each read I/O operation directed to a region of the copy of the storage object that is not mapped to non-volatile storage allocated to the copy of the storage object from at least one storage device contained within the target HCI appliance, causing the source HCI appliance to perform the read I/O operation using the original storage object that is located on the source HCI appliance.

2. The method of claim 1, wherein processing those intercepted I/O operations directed to regions of the copy of the storage object that are not mapped to non-volatile storage allocated to the copy of the storage object from at least one storage device located within the target HCI appliance further includes, for each write I/O operation directed to a region in the copy of the storage object that is not mapped to non-volatile storage allocated to the copy of the storage object from at least one storage device contained within the target HCI appliance:

allocating non-volatile storage from the at least one storage device contained within the target HCI appliance to the copy of the storage object to store data for the write I/O operation;

storing the data for the write I/O operation into the non-volatile storage allocated from the at least one storage device contained within the target HCI appliance; and modifying the mapping metadata for the copy of the storage object to map the region in the copy of the storage object to which the write I/O operation was directed to the allocated non-volatile storage, and to include an indication that the region in the copy of the storage object to which the write I/O operation was directed is mapped to non-volatile storage allocated to the copy of the storage object from at least one storage device contained within the target HCI appliance.

3. The method of claim 2, wherein processing those intercepted I/O operations directed to regions of the copy of the storage object that are not mapped to non-volatile storage allocated to the copy of the storage object from at least one storage device located within the target HCI appliance further includes, for each read I/O operation directed to a region of the copy of the storage object that is not mapped to non-volatile storage allocated to the copy of the storage object from at least one storage device contained within the target HCI appliance, causing the source HCI appliance to perform the read I/O operation using the original storage object that is located on the source HCI appliance by:

transmitting a network I/O operation to the source HCI appliance requesting that the source HCI appliance perform a read I/O operation, while the original storage object is accessed by the original virtual machine located on the source HCI appliance, on a region in the original storage object that corresponds to the region in the copy of the storage object to which the read I/O operation to the copy of the storage object was directed;

receiving, from the source HCI appliance, data read by the source HCI appliance from the region in the original storage that corresponds to the region in the copy of the storage object to which the read I/O operation to the copy of the storage object was directed; and returning, to a requesting entity that issued the read I/O operation directed to the copy of the storage object, the data read by the source HCI appliance from the region in the original storage that corresponds to the region in the copy of the storage object to which the read I/O operation to the copy of the storage object was directed.

4. The method of claim 2, wherein transmitting each network I/O request to the source HCI appliance requesting that the source HCI appliance perform a write I/O operation identical to an intercepted write I/O operation comprises transmitting a network I/O request to the source HCI appliance requesting that the source HCI appliance perform a write I/O operation on a region in the mirror copy of the copy of the storage object that corresponds to the region in the copy of the storage object to which the intercepted write I/O operation was directed.

5. The method of 4, wherein processing those intercepted I/O operations directed to regions of the copy of the storage object that are not mapped to non-volatile storage allocated to the copy of the storage object from at least one storage device located within the target HCI appliance further includes, for each read I/O operation directed to a region of the copy of the storage object that is not mapped to non-volatile storage allocated to the copy of the storage object from at least one storage device contained within the target HCI appliance:

storing, within a cache of the target HCI appliance, the data read by the source HCI appliance from the region in the original storage object that corresponds to the region in the copy of the storage object to which the read I/O operation to the copy of the storage object was directed; and returning the data stored in the cache in response to at least one subsequent read I/O operation directed to the same region in the copy of the storage object.

6. The method of claim 3, further comprising:

detecting a threshold data migration condition;

in response to detecting the threshold data migration condition, and independent from processing of I/O operations directed to the copy of the storage object, requesting the source HCI appliance to transmit data from regions of the original storage object corresponding to regions in the copy of the storage object that are not mapped to non-volatile storage allocated to the copy of the storage object from at least one storage device contained within the target HCI appliance; and allocating non-volatile storage to the copy of the storage object from the at least one storage device contained within the target HCI appliance to store the data received from the source HCI appliance from regions of the original storage object corresponding to regions in the copy of the storage object that are not mapped to non-volatile storage allocated to the copy of the storage object from at least one storage device contained within the target HCI appliance, until all regions in the copy of the storage object are mapped to non-volatile storage allocated to the copy of the storage object from the at least one storage device contained within the target HCI appliance.

7. The method of claim 6, further comprising:

monitoring a rate at which I/O operations are performed on the copy of the storage object; and wherein detecting the threshold data migration condition comprises determining that the rate at which I/O operations are performed on the copy of the storage object exceeds a predetermined maximum acceptable rate.

8. The method of claim 6, further comprising:
monitoring a latency for completion of network I/O requests to the source HCI appliance; and
wherein detecting the threshold data migration condition comprising determining that the latency for completion of network I/O requests to the source HCI appliance exceeds a predetermined maximum acceptable latency.

9. The method of claim 1, further comprising:
prior to causing the copy of the virtual machine to be executed on the target HCI appliance, i) initially creating the copy of the original virtual machine on the source HCI appliance, and ii) initially creating the copy of the storage object on the source HCI appliance, wherein the copy of the storage object is initially mapped to the same non-volatile storage allocated to the original storage object from the at least one storage device contained within the source HCI appliance; and
causing the copy of the virtual machine and the copy of the storage object to be moved to the target HCI appliance to provide load balancing with regard to the source HCI appliance and the target HCI appliance.

10. The method of claim 4, further comprising generating, on the source HCI appliance, a plurality of point in time copies of the copy of the storage object, using the mirror copy of the copy of the storage object stored in the source HCI appliance and the original storage object.

11. The method of claim 1, further comprising allocating non-volatile storage to the mirror copy of the copy of the storage object from at least one storage device contained within the source HCI appliance that is separate and independent from non-volatile storage allocated to the original storage object from at least one storage device contained within the source HCI appliance.

12. The method of claim 11, further comprising using the non-volatile storage allocated to the mirror copy of the copy of the storage object from at least one storage device contained within the source HCI appliance to store the copy of the data written to the copy of the storage object.

13. A hyper-converged infrastructure (HCI) appliance, comprising:
processing circuitry;
at least one non-volatile storage device;
a memory coupled to the processing circuitry, the memory storing program code for preserving locality of storage accesses in the HCI appliance which, when executed by the processing circuitry, causes the processing circuitry to:
receive and execute a copy of a virtual machine on the HCI appliance, wherein the copy of the virtual machine is a copy of an original virtual machine that is located on a source HCI appliance, wherein the copy of the virtual machine issues I/O operations to a copy of a storage object that is also received by the HCI appliance, wherein the copy of the storage object is a copy of an original storage object that is located on the source HCI appliance, wherein the original storage object is accessed by the original virtual machine located on the source HCI appliance, and wherein the original storage object is mapped to non-volatile storage allocated to the original storage object from at least one storage device contained within the source HCI appliance,
in response to receipt of the copy of the virtual machine by the HCI appliance, create mapping metadata for the copy of the storage object that includes indications of regions in the copy of the storage object that are mapped to non-volatile storage allocated to the copy of the storage object from the at least one storage device contained within the HCI appliance, and indications of regions in the copy of the storage object that are not mapped to non-volatile storage allocated to the copy of the storage object from at least one storage device contained within the HCI appliance, wherein the mapping metadata initially indicates, at the time the copy of the virtual machine is received by the HCI appliance, that no regions of the copy of the storage object are mapped to non-volatile storage allocated to the copy of the storage object from at least one storage device contained within the target HCI appliance,
intercept I/O operations issued by the copy of the virtual machine executing on the HCI appliance and directed to regions in the copy of the storage object, while the original storage object is simultaneously being accessed by the original virtual machine located on the source HCI appliance,
in response to the intercepted I/O operations, maintain on the source HCI appliance a copy of data written to the copy of the storage object by, for each write I/O operation directed to the copy of the storage object, transmitting a network I/O request to the source HCI appliance requesting that the source HCI appliance perform a write I/O operation identical to the intercepted write I/O operation on a mirror copy of the copy of the storage object, wherein the mirror copy of the copy of the copy of the storage object that is located on the source HCI appliance is separate and independent from the original storage object, and
in response to the intercepted I/O operations and the mapping metadata for the copy of the storage object,
i) process those intercepted I/O operations directed to regions in the copy of the storage object that are mapped to non-volatile storage allocated to the copy of the storage object from the at least one storage device contained within the HCI appliance using the non-volatile storage allocated to the copy of the storage object from the at least one storage device contained within the HCI appliance, and
ii) process those intercepted I/O operations directed to regions in the copy of the storage object that are not mapped to non-volatile storage allocated to the copy of the storage object from at least one storage device contained within the HCI appliance by, for each read I/O operation directed to a region of the copy of the storage object that is not mapped to non-volatile storage allocated to the copy of the storage object from at least one storage device contained within the HCI appliance, causing the source HCI appliance to perform the read I/O operation using the original storage object that is located on the source HCI appliance.

14. The HCI appliance of claim 13, wherein the program code, when executed by the processing circuitry, and for each write I/O operation directed to a region in the copy of the storage object that is not mapped to non-volatile storage allocated to the copy of the storage object from at least one storage device contained within the HCI appliance, further causes the processing circuitry to:
allocate non-volatile storage from the at least one storage device contained within the HCI appliance to the copy of the storage object to store data for the write I/O operation, store the data for the write I/O operation into the non-volatile storage allocated from the at least one storage device contained within the HCI appliance, and modify the mapping metadata for the copy of the storage object to map the region in the copy of the storage object to which the write I/O operation was directed to the allocated non-volatile storage, and to include an indication that the region in the copy of the storage object to which the write I/O operation was directed is mapped to non-volatile storage allocated to the copy of the storage object from at least one storage device contained within the HCI appliance.

15. The HCI appliance of claim 14, wherein the program code, when executed by the processing circuitry, and for each read I/O operation directed to a region in the copy of the storage object that is not mapped to non-volatile storage allocated to the copy of the storage object from at least one storage device contained within the HCI appliance, further causes the processing circuitry to:

transmit a network I/O operation to the source HCI appliance requesting that the source HCI appliance perform a read I/O operation, while the original storage object is accessed by the original virtual machine located on the source HCI appliance, on a region in the original storage object that corresponds to the region in the copy of the storage object to which the read I/O operation to the copy of the storage object was directed;

receive, from the source HCI appliance, data read by the source HCI appliance from the region in the original storage that corresponds to the region in the copy of the storage object to which the read I/O operation to the copy of the storage object was directed; and return, to a requesting entity that issued the read I/O operation directed to the copy of the storage object, the data read by the source HCI appliance from the region in the original storage that corresponds to the region in the copy of the storage object to which the read I/O operation to the copy of the storage object was directed.

16. The HCI appliance of claim 14, wherein the program code, when executed by the processing circuitry, further causes the processing circuitry to:

transmit each network I/O request to the source HCI appliance requesting that the source HCI appliance perform a write I/O operation identical to an intercepted write I/O operation by transmitting a network I/O request to the source HCI application requesting that the source HCI appliance perform a write I/O operation on a region in the mirror copy of the copy of the storage object that corresponds to the region in the copy of the storage object to which the intercepted write I/O operation was directed.

17. The HCI appliance of claim 16, wherein the program code, when executed by the processing circuitry, and for each read I/O operation directed to a region in the copy of the storage object that is not mapped to non-volatile storage allocated to the copy of the storage object from at least one storage device contained within the HCI appliance, further causes the processing circuitry to:

store, within a cache of the HCI appliance, the data read by the source HCI appliance from the region in the original storage object that corresponds to the region in the copy of the storage object to which the read I/O operation to the copy of the storage object was directed; and return the data stored in the cache in response to at least one subsequent read I/O operation directed to the same region in the copy of the storage object.

18. The HCI appliance of claim 15, wherein the program code, when executed by the processing circuitry, further causes the processing circuitry to:

detect a threshold data migration condition;

in response to detecting the threshold data migration condition, and independent from processing of I/O operations directed to the copy of the storage object, request the source HCI appliance to transmit data from regions of the original storage object corresponding to regions in the copy of the storage object that are not mapped to non-volatile storage allocated to the copy of the storage object from at least one storage device contained within the HCI appliance; and allocate storage to the copy of the storage object from the at least one storage device contained within the HCI appliance to store the data received from the source HCI appliance from regions of the original storage object corresponding to regions in the copy of the storage object that are not mapped to non-volatile storage allocated to the copy of the storage object from at least one storage device contained within the HCI appliance, until all regions in the copy of the storage object are mapped to non-volatile storage allocated to the copy of the storage object from the at least one storage device contained within the HCI appliance.

19. The HCI appliance of claim 18, wherein the program code, when executed by the processing circuitry, further causes the processing circuitry to:

monitor a rate at which I/O operations are performed on the copy of the storage object; and detect the threshold data migration condition by determining that the rate at which I/O operations are performed on the copy of the storage object exceeds a predetermined maximum acceptable rate.

20. The HCI appliance of claim 18, wherein the program code, when executed by the processing circuitry, further causes the processing circuitry to:

monitor a latency for completion of network I/O requests to the source HCI appliance; and detect the threshold data migration condition by determining that the latency for completion of network I/O requests to the source HCI appliance exceeds a predetermined maximum acceptable latency.

21. A computer program product, comprising:

a non-transitory computer readable medium storing program code for preserving locality of storage accesses in a target hyper-converged infrastructure (HCI) appliance, which when carried out by processing circuitry, causes the processing circuitry to perform a method of:

causing a copy of a virtual machine to be moved to and executed on the target HCI appliance, wherein the copy of the virtual machine is a copy of an original virtual machine that is located on a source HCI appliance, wherein the copy of the virtual machine issues I/O operations to a copy of a storage object that is also moved to the target HCI appliance, wherein the copy of the storage object is a copy of an original storage object that is located on the source HCI appliance, wherein the original storage object is accessed by the original virtual machine located on the source HCI appliance, and wherein the original storage object is mapped to non-volatile storage allocated to the original storage object from at least one storage device contained within the source HCI appliance, in response to the copy of the virtual machine being moved to the target HCI appliance, creating mapping metadata for the copy of the storage object that includes indications of regions in the copy of the storage object that are mapped to non-volatile storage allocated to the copy of the storage object from at least one storage device contained within the target HCI appliance, and indications of regions in the copy of the storage object that are not mapped to non-volatile storage allocated to the copy of the storage object from at least one storage device contained within the target HCI appliance, wherein the mapping metadata initially indicates, at the time the copy of the virtual machine is moved to the target HCI appliance, that no regions of the copy of the storage object are mapped to non-volatile storage allocated to the copy of the storage object from at least one storage device contained within the target HCI appliance, intercepting I/O operations issued by the copy of the virtual machine executing on the target HCI appliance and directed to regions in the copy of the storage object, while the original storage object is simultaneously being accessed by the original virtual machine located on the source HCI appliance, in response to the intercepted I/O operations, maintaining on the source HCI appliance a copy of data written to the copy of the storage object by, for each write I/O operation directed to the copy of the storage object, transmitting a network I/O request to the source HCI appliance requesting that the source HCI appliance perform a write I/O operation identical to the intercepted write I/O operation on a mirror copy of the copy of the storage object, wherein the mirror copy of the copy of the copy of the storage object that is located on the source HCI appliance is separate and independent from the original storage object, and in response to the intercepted I/O operations and the mapping metadata for the copy of the storage object,
  i) processing those intercepted I/O operations directed to regions in the copy of the storage object that are mapped to non-volatile storage allocated to the copy of the storage object from at least one storage device contained within the target HCI appliance using the non-volatile storage allocated to the copy of the storage object from the at least one storage device contained within the target HCI appliance, and
  ii) processing those intercepted I/O operations directed to regions in the copy of the storage object that are not mapped to non-volatile storage allocated to the copy of the storage object from at least one storage device contained within the target HCI appliance by, for each read I/O operation directed to a region of the copy of the storage object that is not mapped to non-volatile storage allocated to the copy of the storage object from at least one storage device contained within the target HCI appliance, causing the source HCI appliance to perform the read I/O operation using the original storage object that is located on the source HCI appliance.

* * * * *